(12) United States Patent
Nosaka et al.

(10) Patent No.: US 11,334,144 B2
(45) Date of Patent: May 17, 2022

(54) MEMORY SYSTEM

(71) Applicant: KIOXIA CORPORATION, Minato-ku (JP)

(72) Inventors: Yuusuke Nosaka, Inagi (JP); Kouji Watanabe, Tokyo (JP); Tomonori Tsuhata, Zushi (JP); Shingo Akita, Kamakura (JP)

(73) Assignee: KIOXIA CORPORATION, Minato-ku (JP)

( * ) Notice: Subject to any disclaimer, the term of this patent is extended or adjusted under 35 U.S.C. 154(b) by 405 days.

(21) Appl. No.: 16/386,813

(22) Filed: Apr. 17, 2019

(65) Prior Publication Data

US 2020/0026346 A1 Jan. 23, 2020

(30) Foreign Application Priority Data

Jul. 20, 2018 (JP) .............................. JP2018-136698

(51) Int. Cl.
*G06F 1/3296* (2019.01)
*G06F 9/50* (2006.01)
*G06F 1/3234* (2019.01)

(52) U.S. Cl.
CPC .......... *G06F 1/3296* (2013.01); *G06F 1/3275* (2013.01); *G06F 9/5027* (2013.01)

(58) Field of Classification Search
CPC .... G06F 9/5072; G06F 1/3296; G06F 1/3275; G11C 11/5628
See application file for complete search history.

(56) References Cited

U.S. PATENT DOCUMENTS

| 9,405,671 | B2 | 8/2016 | Tanaka et al. | |
| 9,575,677 | B2 | 2/2017 | Ellis et al. | |
| 9,727,248 | B2 | 8/2017 | Sarcone et al. | |
| 2010/0061148 | A1* | 3/2010 | Komatsu ................ | G11C 16/10 365/185.03 |
| 2011/0194346 | A1* | 8/2011 | Yoon ...................... | G11C 16/10 365/185.03 |
| 2012/0287710 | A1* | 11/2012 | Shirakawa ......... | G11C 16/3418 365/185.03 |
| 2017/0177218 | A1 | 6/2017 | Kanno | |

FOREIGN PATENT DOCUMENTS

| JP | 2014-232540 | 12/2014 |
| JP | 2017-117055 | 6/2017 |

* cited by examiner

*Primary Examiner* — Kim Huynh
*Assistant Examiner* — Joshua Neveln
(74) *Attorney, Agent, or Firm* — Oblon, McClelland, Maier & Neustadt, L.L.P.

(57) ABSTRACT

According to one embodiment, a memory system includes a memory chip and a controller coupled to the memory chip and configured to: instruct the memory chip to execute a write operation in one of a first operation mode and a second operation mode, a program voltage used in the second operation mode being determined on the basis of first information obtained in the first operation mode; manage a power consumption value of the second operation mode on the basis of the first information; and perform power throttling control on the basis of the managed power consumption value.

18 Claims, 8 Drawing Sheets

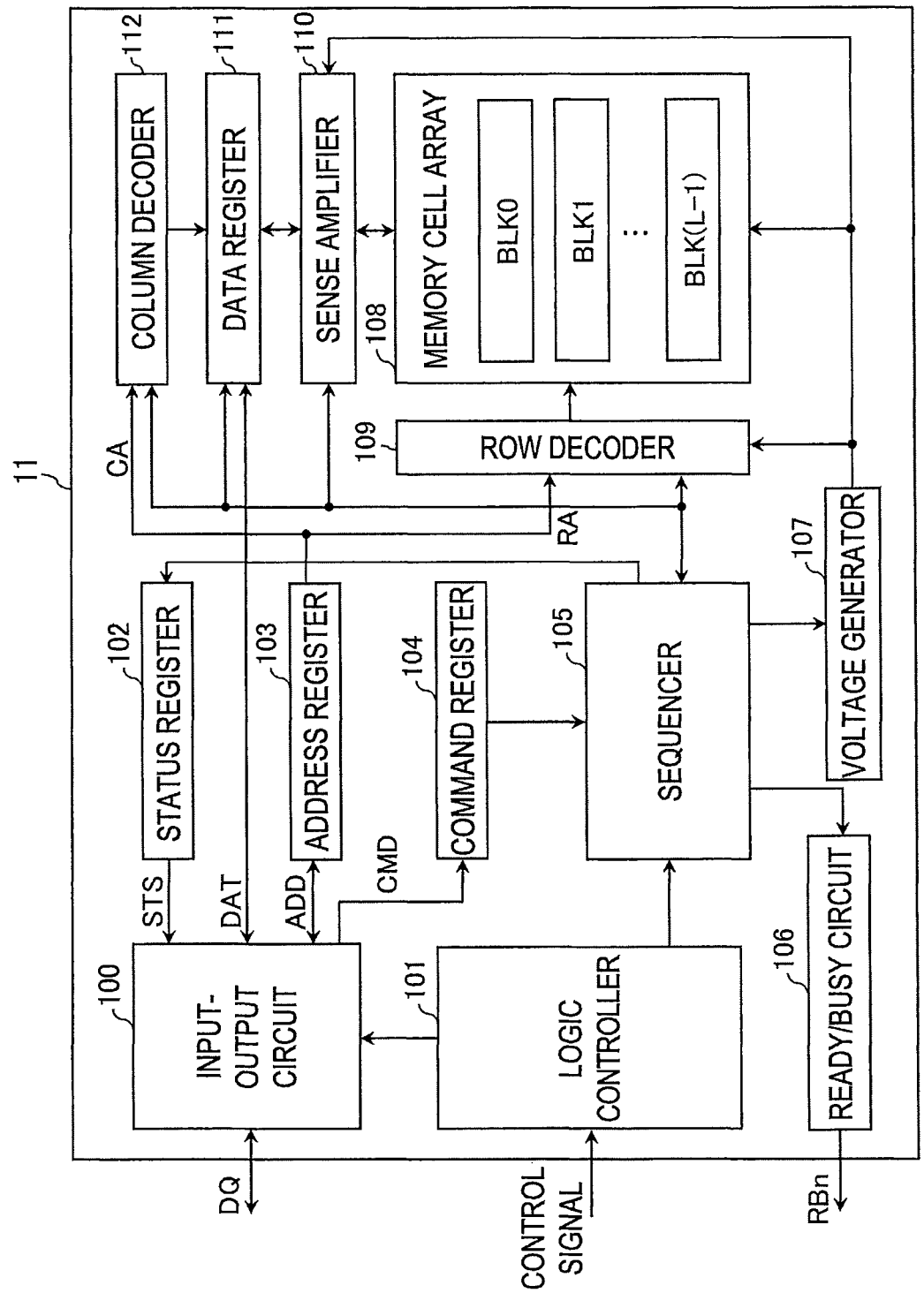
F I G. 2

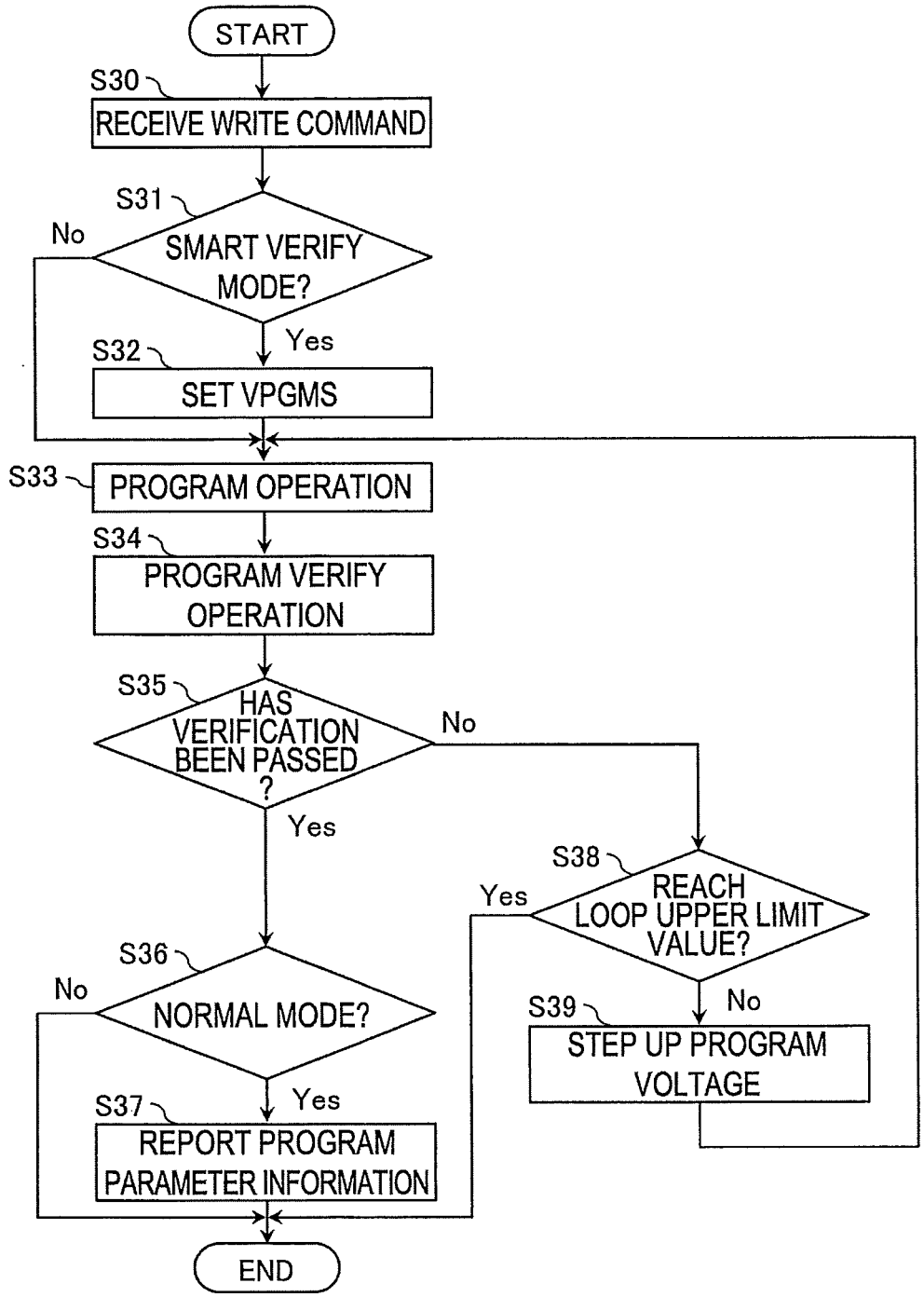
F I G. 7

MEMORY SYSTEM

CROSS-REFERENCE TO RELATED APPLICATIONS

This application is based upon and claims the benefit of priority from Japanese Patent Application No. 2018-136698, filed Jul. 20, 2018, the entire contents of which are incorporated herein by reference.

FIELD

Embodiments described herein relate generally to a memory system.

BACKGROUND

As a memory system, a solid state drive (SSD) to which a non-volatile semiconductor memory such as a NAND-type flash memory is mounted is known.

BRIEF DESCRIPTION OF THE DRAWINGS

FIG. 2 is a block diagram of a memory chip included in the memory system according to the embodiment;

FIG. 7 is a flowchart of a write operation in the memory chip included in the memory system according to the embodiment.

DETAILED DESCRIPTION

In general, according to one embodiment, a memory system includes a memory chip and a controller coupled to the memory chip and configured to: instruct the memory chip to execute a write operation in one of a first operation mode and a second operation mode, a program voltage used in the second operation mode being determined on the basis of first information obtained in the first operation mode; manage a power consumption value of the second operation mode on the basis of the first information; and perform power throttling control on the basis of the managed power consumption value.

1 Configuration

Hereinafter, a memory system according to an embodiment will be described. In the following descriptions, a case where the memory system is a solid state drive (SSD) will be described by way of example.

1.1 Overall Configuration of Memory System

First, an overall configuration of a memory system 1 will be described using FIG. 1.

Figure 1:
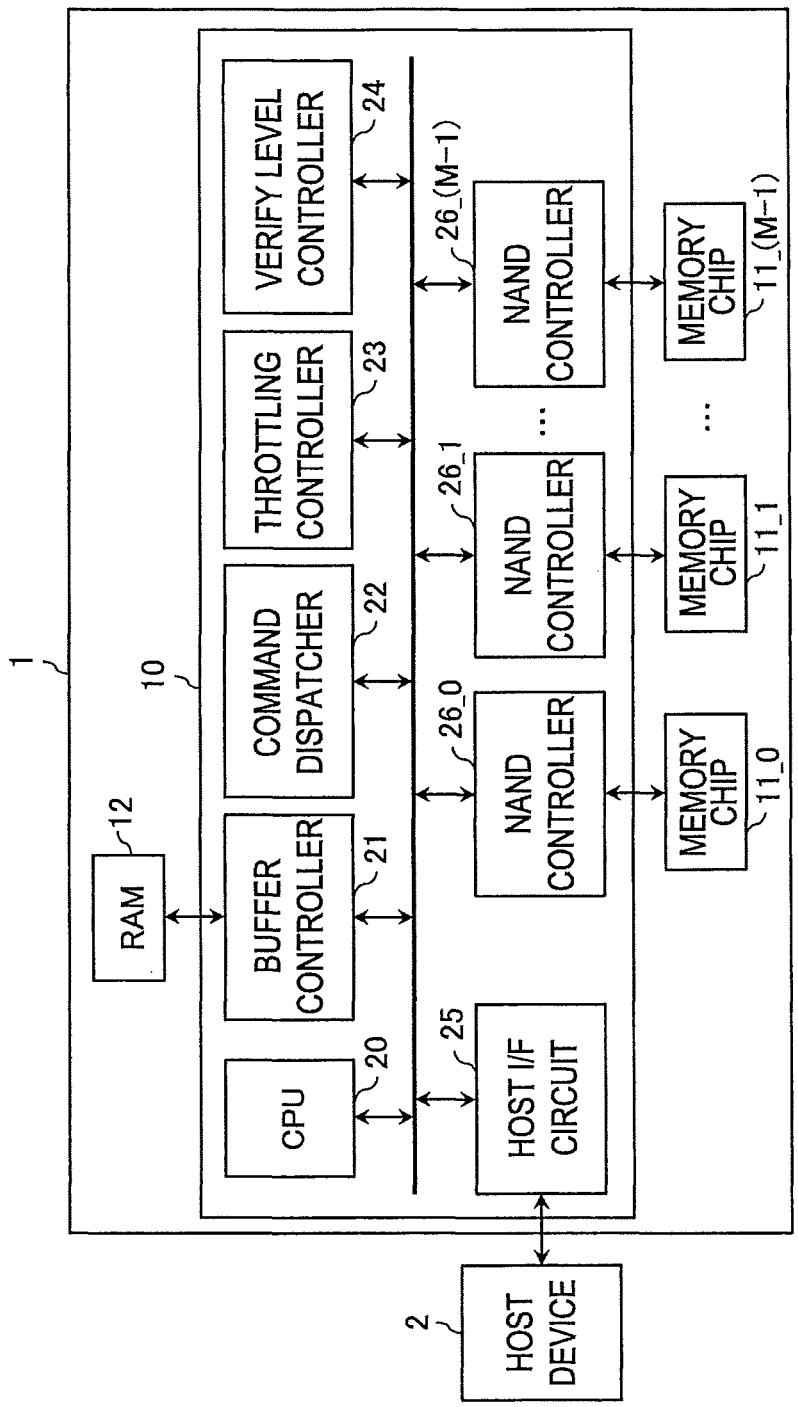
FIG. 1 is a block diagram of a memory system according to an embodiment.

As illustrated in FIG. 1, the memory system 1 includes a system controller 10, M (M is an integer of 2 or more) non-volatile memory chips 11_0 to 11_(M−1), and a random access memory (RAM) 12. Hereinafter, the memory chips 11_0 to 11_(M−1) will be respectively referred to as the memory chip 11, unless specified.

The system controller 10 manages a memory space of the memory chip 11. In addition, the system controller 10 instructs the memory chip 11 to execute read, write, and erase operations. in response to a request from a host device 2. The system controller 10 may be, for example, a system on a chip (SoC). Note that each function of the system controller 10 may be realized by a dedicated circuit, or may be realized by a processor executing a firmware. In the present embodiment, a case where a dedicated circuit to realize each function is provided in the system controller 10 will be described.

In the system controller 10, an upper limit value of power consumption is set as a device specification. In order to strictly keep to the upper limit value of power consumption, power throttling control is performed in the system controller 10. More specifically, for example, in the system controller 10, an upper limit value of a power consumption value is set in advance to control power consumption of the entire memory system 1. Then, among commands transmitted from the system controller 10 to the memory chips 11, a command with relatively large power consumption, such as a write operation or an erase operation, is defined as a throttling target command, and is assigned a power consumption value corresponding to power consumption of each of the commands. For example, if power consumption in a write operation is larger than that in an erase operation, the power consumption value of the write operation is set larger than a power consumption value of the erase operation. If a sum of power consumption values of a plurality of commands to be executed does not exceed an upper limit value of the power consumption value, the system controller 10 can execute these commands at the same time. The system controller 10 controls power consumption by controlling a sum of power consumption values of a plurality of commands being executed so as not to exceed the upper limit value of the power consumption value of the entire memory system.

Note that in the present embodiment, the write operation includes two operation modes: a normal mode and a smart verify mode, and the power consumption value varies depending on a selected operation mode. The smart verify mode is a mode for performing the write operation by using a program voltage determined as a result of the normal mode. If the smart verify mode is selected, the power consumption is reduced more than the normal mode, and thus the power consumption value of the smart verify mode is set to a value smaller than the power consumption value of the normal mode. The two operation modes will be discussed later in detail.

An example of the power throttling control will be briefly described. For example, it is assumed that the upper limit value of the power consumption value in the memory system 1 is "10," the power consumption value in the normal mode is "3," and the power consumption value in the smart verify mode is "1." If only the normal mode is selected, only up to three commands can be executed at the same time. If only the smart verify mode is selected, however, up to ten commands can be executed at the same time.

The system controller 10 includes a processor (CPU: central processing unit) 20, a buffer controller 21, a command dispatcher 22, a throttling controller 23, a verify level controller 24, a host interface circuit 25, and M NAND controllers 26_0 to 26_(M−1). Hereinafter, the NAND controllers 26_0 to 26_(M−1) will be respectively referred to as the NAND controller 26, unless specified.

The processor 20 controls the overall operation of the system controller 10. In addition, the processor 20 executes various types of processing for managing the memory chip 11, such as ware leveling. Furthermore, the processor 20 executes various kinds of arithmetic operations. For example, the processor 20 executes encryption processing and randomization processing of data.

The buffer controller 21 controls transmission/reception of data with the RAM 12.

When receiving an operation request such as a write operation, a read operation, or an erase operation, from the host device 2 or the processor 20, the command dispatcher 22 generates a command (including an address or data, etc.) corresponding to the operation request. Then, the command dispatcher 22 selects the NAND controller 26 to execute the request, and transmits the generated command.

The throttling controller 23 manages power consumption values of a plurality of commands being executed in the entire memory system 1 to perform throttling control. For example, when receiving an inquiry of whether or not a throttling management target command is executable from the NAND controller 26, the throttling controller 23 determines whether or not the command is executable on the basis of a power consumption value of the inquired command and a power consumable amount, which is a value obtained by subtracting a sum of power consumption values of commands being executed from the upper limit value of the power consumption value. The throttling controller 23 then transmits the result of the determination to the NAND controller 26. In addition, when receiving a report of command completion from the NAND controller 26, the throttling controller 23 adds a power consumption value of the completed command to the power consumable amount.

The verify level controller 24 manages a power consumption value when executing a write operation for a preset unit of a memory area. More specifically, for example, if there is no program parameter information such as the number of program loops until a write operation completion, a program voltage at a write operation completion, or writing speed information corresponding to a memory area, that is, if a write operation in the normal mode has not yet been executed in the memory area, the verify level controller 24 sets a default power consumption value to such a memory area. In addition, for example, if there is program parameter information corresponding to a memory area, that is, if a write operation in the normal mode has been executed in the memory area, the verify level controller 24 sets, to such a memory area, a power consumption value for the smart verify mode on the basis of the program parameter information obtained in the normal mode. Note that a different power consumption value for the smart verify mode may be set for each memory area on the basis of the program parameter information.

A power consumption value set by the verify level controller 24 is associated with an address of the memory chip 11 and stored in the RAM 12, for example.

When receiving information as to a write command to be executed from the NAND controller 26, the verify level controller 24 confirms a power consumption value of a write operation in the normal mode or the smart verify mode for a corresponding memory area, and transmits a result thereof to the NAND controller 26.

The host interface circuit 25 is coupled to the host device 2 via a controller bus, and manages communications with the host device 2. The host interface circuit 25 transfers a request (including instruction, address, and data) received from the host device 2 to, for example, the processor 20, the buffer controller 21, and the command dispatcher 22. In addition, in response to an instruction of the processor 20, the host interface circuit 25 transmits data, etc. read from the memory chip 11 to the host device 2.

The NAND controller 26 controls its corresponding memory chip 11. In an example of FIG. 1, one NAND controller 26 controls one memory chip 11, but one NAND controller 26 may control a plurality of memory chips 11.

When receiving a command from the command dispatcher 22, the NAND controller 26 determines one command to be executed in the memory chip 11 while adjusting the execution order of a plurality of commands. If a write command is received from the command dispatcher 22, the NAND controller 26 inquires from the verify level controller 24 about a power consumption value corresponding to the command. In addition, if the determined command is a throttling management target, the NAND controller 26 inquires from the throttling controller 23 about whether or not the command is executable.

The memory chip 11 performs a write operation and a read operation in a specific write unit consisting of a plurality of memory cells. Furthermore, the memory chip 11 erases data in an erase unit consisting of a plurality of write units. For example, if the memory chip 11 is a NAND-type flash memory, the memory chip 11 performs a write operation and a read operation in a page unit. Hereinafter, a case where the memory chip 11 is a three-dimensional stacked NAND-type flash memory with memory cell transistors stacked three-dimensionally above a semiconductor substrate will be described. It should be noted that the memory chip 11 is not limited to a three-dimensional stacked NAND-type flash memory, and may be a flat NAND-type flash memory with memory cell transistors arranged two-dimensionally above a semiconductor substrate, and may be another non-volatile memory. The configuration of the memory chip 11 will be described later in detail.

The RAM 12 is a semiconductor memory such as a dynamic random access memory (DRAM), and is used as a working area of the processor 20. For example, the RAM 12 stores a power consumption value and program parameter information, etc. in association with an address of the memory chip 11. It should be noted that the RAM 12 may be provided in the system controller 10.

1.2 Configuration of Memory Chip

Next, a configuration of the memory chip 11 will be described using FIG. 2. In FIG. 2, some of the connections between the blocks are indicated by arrows; however, the connections between the blocks are not limited to those shown in FIG. 2.

As shown in FIG. 2, the memory chip 11 includes an input-output circuit 100, a logic controller 101, a status register 102, an address register 103, a command register 104, a sequencer 105, a ready/busy circuit 106, a voltage generator 107, a memory cell array 108, a row decoder 109, a sense amplifier 110, a data register 111, and a column decoder 112.

The input-output circuit 100 controls input and output of a signal DQ to and from the NAND controller 26. More specifically, the input-output circuit 100 transmits data DAT received from the NAND controller 26 via the signal DQ to the data register 111, transmits an address ADD to the address register 103, and transmits a command CMD to the command register 104. In addition, the input-output circuit 100 transmits status information STS received from the status register 102, the data DAT received from the data register 111, and the address ADD received from the address register 103, etc. to the NAND controller 26 via the signal DQ.

The logic controller 101 receives various control signals from the NAND controller 26. Then, the logic controller 101 controls the input-output circuit 100 and the sequencer 105 according to the received control signals.

The status register 102, for example, temporarily stores the status information STS in write, read, and erase operations, and notifies the NAND controller 26 of whether the operation is normally finished. In addition, the status register 102 temporarily stores the program parameter information obtained during a write operation.

The address register 103 temporarily stores the address ADD received from the NAND controller 26 via the input-output circuit 100. Then, the address register 103 transfers a row address RA to the row decoder 109, and transfers a column address CA to the column decoder 112.

The command register 104 temporarily stores a command CMD received from the NAND controller 26 via the input-output circuit 100, and transfers the command CMD to the sequencer 105.

The sequencer 105 controls an operation of the entire memory chip 11. More specifically, the sequencer 105 controls, for example, the status register 102, the ready/busy circuit 106, the voltage generator 107, the row decoder 109, the sense amplifier 110, the data register 111, and the column decoder 112, etc., according to the command CMD stored in the command register 104, and executes write, read, and erase operations, etc.

In addition, the sequencer 105 has a function (hereinafter, referred to as a smart verify function) of detecting a writing speed, etc. for each memory area. More specifically, for example, the sequencer 105 extracts the program parameter information obtained as a result of a write operation in the normal mode. In addition, the sequencer 105 determines a program voltage for the smart verify mode on the basis of the program parameter information.

The ready/busy circuit 106 transmits a ready/busy signal RBn to the NAND controller 26 according to an operating status of the sequencer 105. More specifically, if the memory chip 11 is in a ready state, the signal RBn is at a high ("H") level, and if the memory chip 11 is in a busy state, the signal RBn is at a low ("L") level.

The voltage generator 107 generates voltages needed for write, read, and erase operations according to the control of the sequencer 105, and supplies the generated voltages to, for example, the memory cell array 108, the row decoder 109, and the sense amplifier 110. The row decoder 109 and the sense amplifier 110 apply the voltages supplied from the voltage generator 107 to memory cell transistors in the memory cell array 108.

The memory cell array 108 includes a plurality of non-volatile memory cell transistors (hereinafter, referred to as "memory cell") associated with rows and columns.

The row decoder 109 decodes the row address RA. The row decoder 109 applies a necessary voltage to the memory cell array 108 on the basis of a result of the decoding.

In a read operation, the sense amplifier 110 senses data read from the memory cell array 108. Then, the sense amplifier 110 transmits the read data to the data register 111.

In addition, in a write operation, the sense amplifier 110 transmits write data to the memory cell array 108.

The data register 111 comprises a plurality of latch circuits. The latch circuit temporarily latches write data or read data.

In write, read, and erase operations, for example, the column decoder 112 decodes the column address CA, and selects latch circuits in the data register 111 according to a result of the decoding.

1.3 Configuration of Memory Cell Array

Next, a configuration of the memory cell array 108 will be described using FIG. 3. An example of FIG. 3 illustrates a block BLK0, but other blocks BLK have similar configurations.

Figure 3:
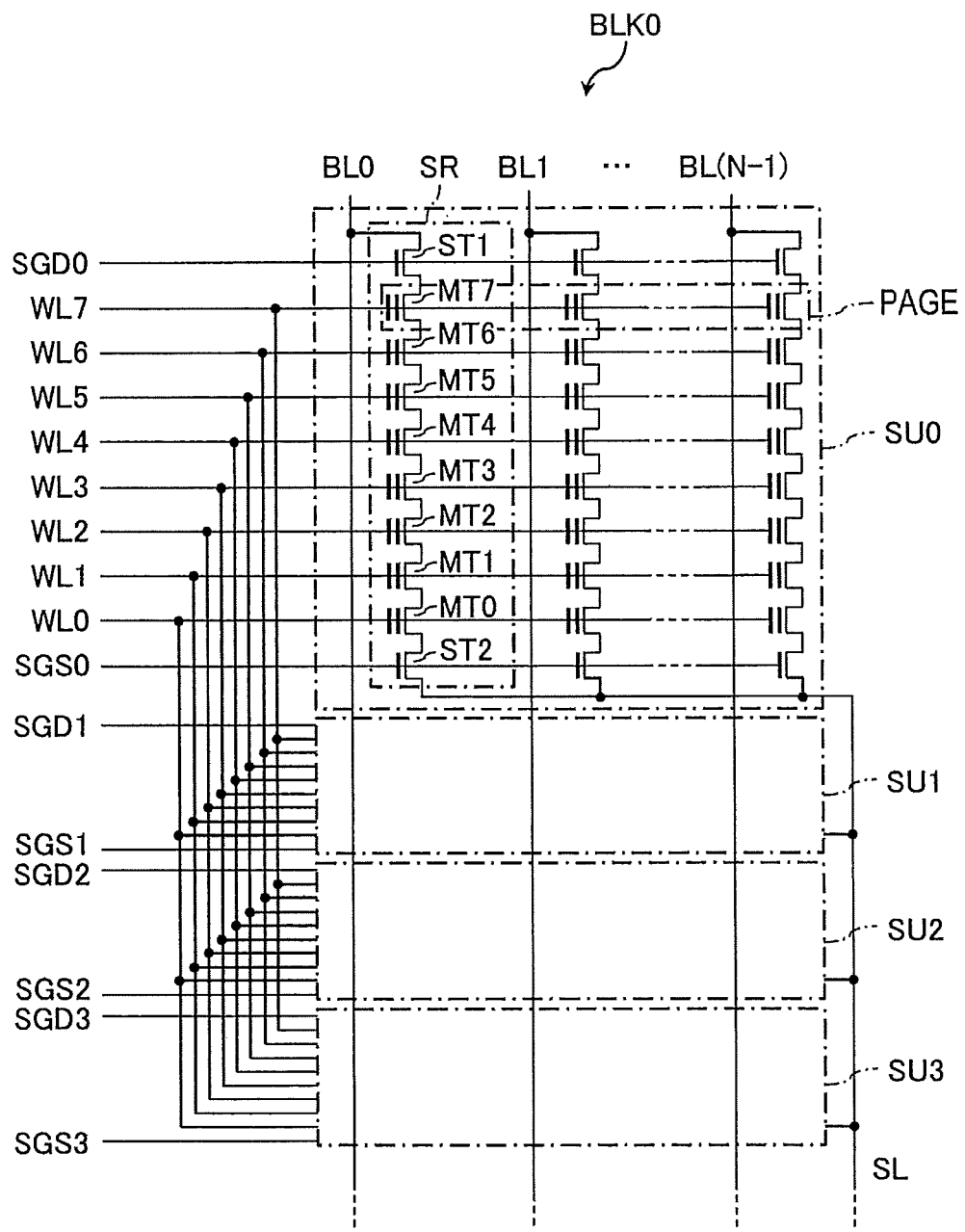
FIG. 3 is a circuit diagram of a memory cell array in the memory chip included in the memory system according to the embodiment.

As illustrated in FIG. 3, the block BLK0 includes, for example, four string units SU (SU0 to SU3). Then, each of the string units SU includes a plurality of NAND strings SR. Each of the NAND strings SR includes, for example, eight memory cell transistors MT0 through MT7 and select transistors ST1 and ST2. Hereinafter, the memory cell transistors MT0 through MT7 will be respectively referred to as the memory cell transistor MT, unless specified. The memory cell transistor MT comprises a control gate and a charge storage layer, and stores data in a nonvolatile manner.

It should be noted that the memory cell transistor MT may be of a MONOS type in which an insulating film is used as the charge storage layer, or an FG type in which a conductive layer is used as the charge storage layer. The number of memory cell transistors MT is not limited to 8, and may be 16, 32, 64, 96, 128, etc., and the number thereof is not limited to these numbers. Moreover, the number of the select transistors ST1 and ST2 may be one or more.

The memory cell transistors MT are coupled in series between a source of the select transistor ST1 and a drain of the select transistor ST2. More specifically, current paths of the memory cell transistors MT0 through MT7 are coupled in series. A drain of the memory cell transistor MT7 is coupled to a source of the select transistor ST1, and a source of the memory cell transistor MT0 is coupled to a drain of the select transistor ST2.

Gates of the select transistors ST1 in the string units SU0 through SU3 are coupled to the row decoder 109 via the respective select gate lines SGD0 through SGD3. Similarly, a gate of the select transistor ST2 in each of the string units SU0 through SU3 is coupled to the row decoder 109 via the respective select gate lines SGS0 through SGS3. Hereinafter, the select gate lines SGD0 through SGD3 will be respectively referred to as the select gate line SGD, unless specified. The select gate lines SGS0 through SGS3 will be respectively referred to as the select gate line SGS, unless specified. It should be noted that the select gate lines SGS0 through SGS3 of the respective string units SU may be coupled in common.

Control gates of the memory cell transistors MT0 through MT7 in the block BLK are commonly coupled to word lines WL0 through WL7, respectively. The word lines WL0 through WL7 are coupled to the row decoder 109. Hereinafter, the word lines WL0 through WL7 will be respectively referred to as the word line WL, unless specified.

Drains of the select transistors ST1 of the NAND strings SR in the string unit SU are respectively coupled to different bit lines BL0 through BL (N−1) (N is an integer of 2 or more). Hereinafter, the bit lines BL0 through BL (N−1) will be respectively referred to as the bit line BL, unless specified. Each bit line BL is coupled to the sense amplifier 110. Each bit line BL couples one NAND string SR in each string unit SU in common among a plurality of blocks BLK.

Moreover, sources of a plurality of select transistors ST2 are coupled in common to a source line SL. Namely, the string unit SU is a group of NAND strings SR coupled to different bit lines BL and the same select gate lines SGD and SGS. In addition, the block BLK is a group of a plurality of string units SU sharing the word lines WL. Thus, the memory cell array 108 is a group of a plurality of blocks BLK sharing the bit lines BL.

Data writing and reading are performed simultaneously on the memory cell transistors MT coupled to any one of the word lines WL (hereinafter, referred to as a selected word line WL) in any one of the string units SU. Hereinafter, a group of one-bit data to be written to or read from each of the memory cell transistors MT selected simultaneously will be called a "page."

2 Write Operation

Next, a write operation will be described. The write operation roughly includes a program operation and a program verify operation. Then, by repeating a combination of the program operation and the program verify operation (hereinafter, referred to as "program loop"), a threshold voltage of the memory cell transistor MT is increased toward a target level.

The program operation is an operation for increasing a threshold voltage (or maintaining a threshold voltage by prohibiting injection) by injecting electrons into a charge storage layer.

The program verify operation is an operation for reading data after a program operation and determining whether a threshold voltage of the memory cell transistor MT reaches a target level. Hereinafter, a case where a threshold voltage of the memory cell transistor MT reaches a target level will be referred to as "verification is passed," and a case where a threshold voltage does not reach the target level will be referred to as "verification is failed."

2.1 Operation Mode in Write Operation

Next, an operation mode in a write operation will be described using FIG. 4.

The write operation includes two operation modes: a normal mode and a smart verify mode.

The normal mode is an operation mode of executing a write operation using a voltage VPGM set in advance as a program voltage of a first program loop.

The smart verify mode is an operation mode of executing a write operation using a voltage VPGMS set on the basis of the program parameter information as a program voltage of a first program loop. The voltage VPGMS is a voltage higher than the voltage VPGM. For example, the first write operation in a target memory area is executed in the normal mode, and the program parameter information is extracted using the smart verify function. Then, subsequent write operations in the target memory area are executed in the smart verify mode. It should be noted that the size of a memory area managed in the smart verify function may be any units such as an entire memory cell array 108 (i.e., the entire memory chip 11), a block BLK, a string unit SU, or a page.

In the present embodiment, a case where the first program voltage VPGMS in the smart verify mode is set on the basis of the number of program loops of the normal mode will be described, but for example, the voltage VPGMS may be set on the basis of a program voltage, a write operation time, or writing speed information of the last program loop in the normal mode.

Figure 4:
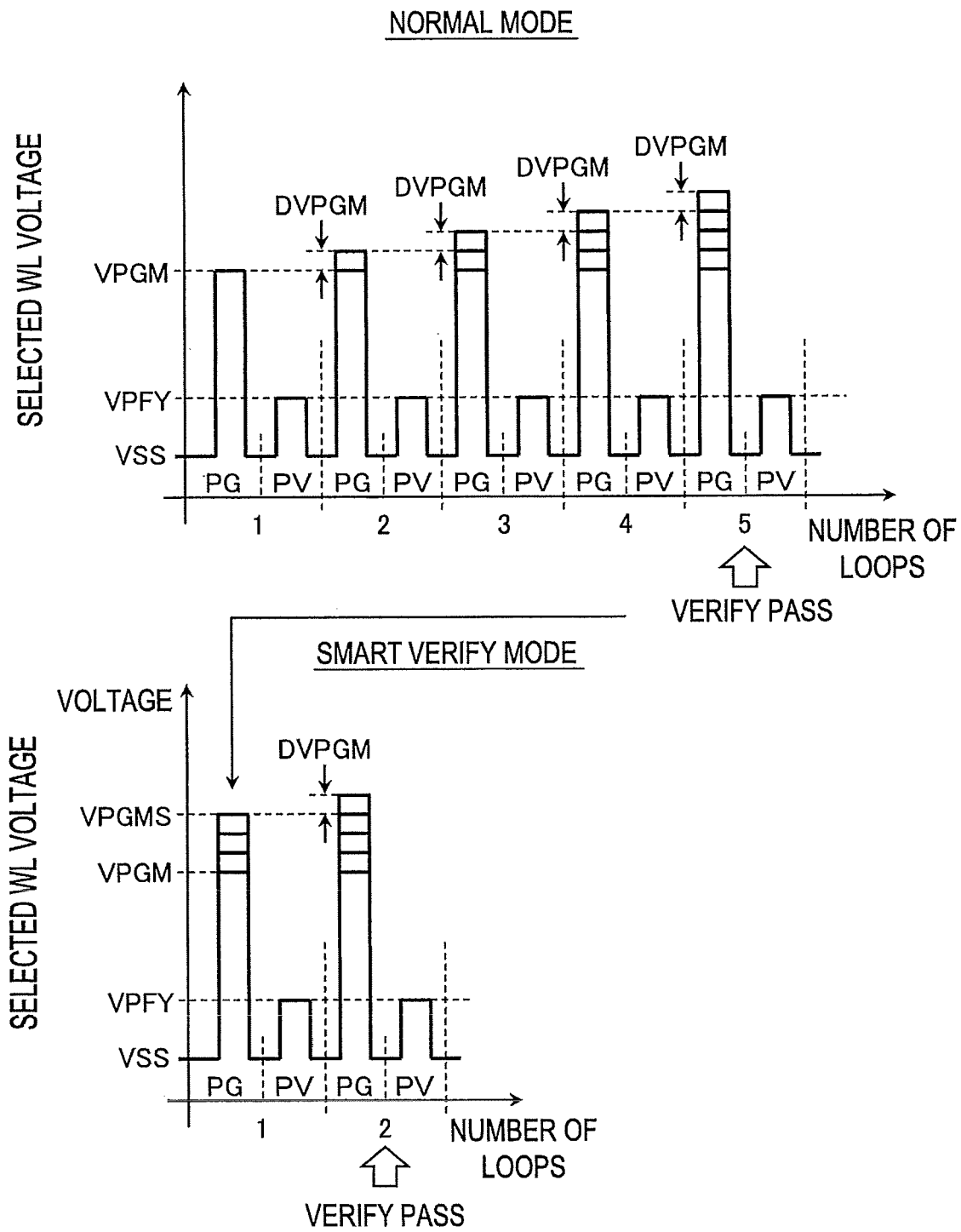
FIG. 4 is a diagram illustrating a relationship between a voltage of a selected word line and a program loop in a normal mode and a smart verify mode of a write operation in the memory system according to the embodiment.

As illustrated in an upper figure of FIG. 4, more specifically, firstly, the memory system 1 executes the first write operation in a target memory area in the normal mode. At this time, in the first program loop, the row decoder 109 applies a voltage VPGM as a program voltage to the selected word line WL during a program operation (PG), and applies a verify voltage VPFY according to a target level to the selected word line WL during a program verify operation (PV). Then, each time the program loop is repeated, the program voltage is stepped up by a voltage DVPGM, and the verification is passed in the fifth program loop. According to this result, the first program voltage VPGMS of the smart verify mode is determined.

As illustrated in a lower figure of FIG. 4, on the basis of the result of the normal mode, for example, the fourth program voltage (VPGM+3×DVPGM) in the normal mode is set as the voltage VPGMS. Then, the first program loop is executed using the set voltage VPGMS. Namely, in the smart verify mode, the write operation is executed from the fourth program loop of the normal mode. Then, similarly to the normal mode, each time the program loop is repeated, the program voltage is stepped up by the voltage DVPGM. As a result, for example, in the smart verify mode, the verification is passed in the second program loop, and the number of program loops is reduced from five to two.

In the example of FIG. 4, the fifth program voltage (VPGM+4×DVPGM) may be set as the voltage VPGMS. The voltage VPGMS may be freely set. For example, an intermediate voltage between the fourth program voltage and the fifth program voltage may be set as the voltage VPGMS.

2.2 Overall Flow of Operation in Memory System

Next, an overall flow of an operation of the memory system 1 will be described using FIG. 5.

Figure 5:
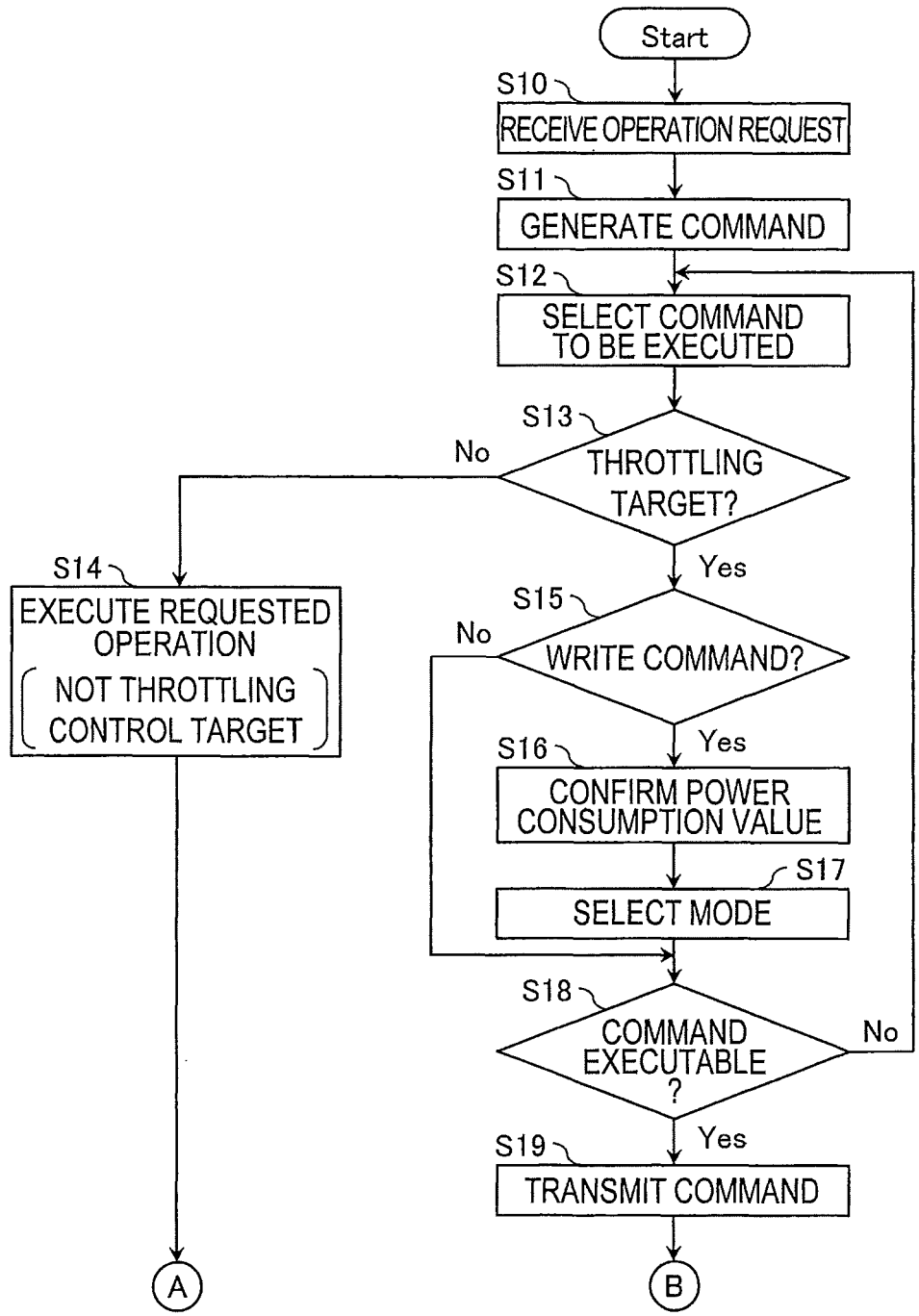
FIG. 5 is a flowchart illustrating a flow of an overall operation in the memory system according to the embodiment.

As illustrated in FIG. 5, when receiving an operation request (such as a write request, a read request, or an erase request) from the host device 2 or the processor 20 (step S10), the command dispatcher 22 generates a command (step S11), and transmits the command to a selected NAND controller 26.

When receiving commands, the NAND controller 26 selects a command to be executed after adjusting the execution order of the commands (step S12).

If the selected command is not a power throttling target (step S13_No), the NAND controller 26 transmits the command to the corresponding memory chip 11. The sequencer 105 executes a requested operation on the basis of the received command which is not the power throttling control target (step S14). When the requested operation is finished, the sequencer 105 reports to the NAND controller 26.

If the selected command is a power throttling target (step S13_Yes), the NAND controller 26 confirms whether the command is a write command (step S15).

If the command is a write command (step S15_Yes), the NAND controller 26 inquires from the verify level controller 24 about a power consumption value corresponding to the write command.

The verify level controller 24 confirms a power consumption value corresponding to the write command received from the NAND controller 26 (step S16), and transmits its result to the NAND controller 26. More specifically, the verify level controller 24 obtains from the RAM 12 a power consumption value corresponding to an address given to the write command, and transmits its result to the NAND controller 26. At this time, for example, the verify level controller 24 may read the program parameter information from the RAM 12, and transmit the program parameter information to the NAND controller 26.

The NAND controller 26 selects an operation mode of either the normal mode or the smart verify mode on the basis of the power consumption value, etc. received from the verify level controller 24 (step S17).

If the command is not a write command (step S15_No), or after selecting the operation mode at step S17, the NAND controller 26 confirms with the throttling controller 23 about whether or not the selected command is executable (step S18). The throttling controller 23 reports a determination result of comparing a power consumption value of the received command and a power consumable amount to the NAND controller 26.

If the selected command is not executable (step S18_No) that is, if it is determined that the power consumption value of the selected command is larger than the power consumable amount by the throttling controller 23, the process returns to step S12, and the NAND controller 26 selects a command again.

If the selected command is executable (step S18_Yes), that is, if it is determined that the power consumption value of the selected command is equal to or less than the power consumable amount by the throttling controller 23, the NAND controller 26 transmits the command to the corresponding memory chip 11 (step S19).

Figure 6:
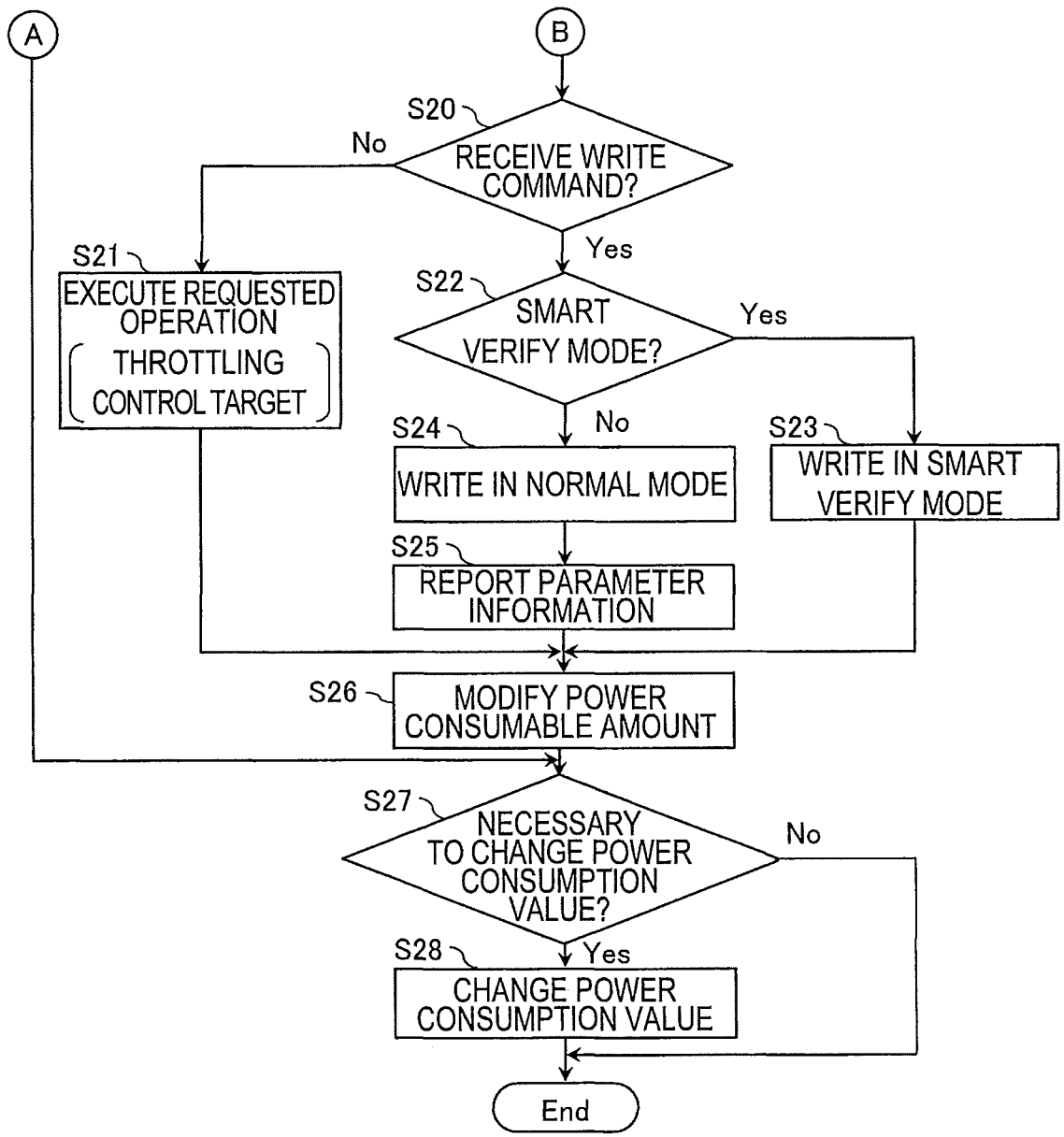
FIG. 6 is a flowchart illustrating the flow of the overall operation in the memory system according to the embodiment.

As illustrated in FIG. 6, if the command received by the memory chip 11 is not a write command (step S20_No), the sequencer 105 executes a requested operation on the basis of the received power throttling control target command (step S21). When the requested operation is finished, the sequencer 105 reports to the NAND controller 26.

If the command received by the memory chip 11 is a write command (step S20_Yes), the sequencer 105 selects either the normal mode or the smart verify mode on the basis of the received write command (step S22).

If the smart verify mode is selected (S22_Yes), the sequencer 105 executes the write operation in the smart verify mode on the basis of the received command (step S23). When the write operation in the smart verify mode is finished, the sequencer 105 reports to the NAND controller 26.

If the normal mode is selected (step S22_No), the sequencer 105 executes the write operation in the normal mode on the basis of the received command (step S24).

When the write operation in the normal mode is finished, the sequencer 105 reports the finish of the write operation and obtained program parameter information to the NAND controller 26 (step S25).

When receiving the report of the requested operation at step S21 from the memory chip 11, or when receiving the report of the write operation at step S23 or S25, the NAND controller 26 reports to the throttling controller 23. When receiving the report from the NAND controller 26, the throttling controller 23 adds a power consumption value corresponding to the operation whose finish report is received to the power consumable amount, and modifies the power consumable amount (step S26).

Next, the NAND controller 26 confirms whether it is necessary to change the power consumption value on the basis of the finish report received from the memory chip 11.

If it is necessary to change the power consumption value (step S27_Yes), more specifically, if the program parameter information is received from the memory chip 11 at step S25, or if the erase operation is executed at step S21, the NAND controller 26 reports the program parameter information received from the memory chip 11 or the finish report of the erase operation in the target memory area to the verify level controller 24. The verify level controller 24 changes the power consumption value of the write operation in the smart verify mode in the target memory area on the basis of the program parameter information or the finish report of the erase operation (step S28), and stores its result in the RAM 12.

More specifically, for example, if the program parameter information is received, the verify level controller 24 determines the power consumption value of the write operation in the smart verify mode in the target memory area on the basis of the program parameter information. Then, the verify level controller 24 stores the determined power consumption value and the program parameter information in the RAM 12. In addition, for example, if the finish report of the erase operation is received, the verify level controller 24 changes the power consumption value of the write operation in the target memory area to a default power consumption value. Then, the verify level controller 24 stores the default power consumption value in the RAM 12. In addition, for example, from the RAM 12, the program parameter information of the write operation in the smart verify mode in the target memory area is deleted.

If it is not necessary to change the power consumption value (step S27_No), more specifically, if the finish report of the requested operation is received from the memory chip 11 at step S14, the finish report of the requested operation other than the erase operation is received at step S21, or the finish report of the write operation in the smart verify mode is received at step S23, or after changing the power consumption value at step S28, the NAND controller 26 returns a response to the operation request to the host device 2 or the processor 20.

2.3 Flow of Write Operation in Memory

Next, a flow of a write operation in the memory chip 11 will be described in detail using FIG. 7.

As illustrated in FIG. 7, the memory chip 11 receives a write command from the corresponding NAND controller 26 (step S30).

If a write command for instructing the smart verify mode is received (step S31_Yes), the sequencer 105 selects the smart verify mode, and sets the voltage VPGMS on the basis of the command (step S32). More specifically, when receiving the program parameter information from the NAND controller 26, the sequencer 105 sets the program voltage VPGMS on the basis of the received program parameter information.

If the write command for instructing the normal mode is received (step S31_No), the sequencer 105 selects the normal mode, and sets the voltage VPGM as the first program voltage.

The sequencer 105 executes the program operation after setting the voltage VPGM or the voltage VPGMS as the first program voltage (step S33).

After the program operation is finished, the sequencer 105 executes a program verify operation (step S34).

If the verification has been failed (step S35_No), the sequencer 105 confirms whether the number of program loops reaches a preset upper limit value (step S38).

If the number of program loops does not reach the upper limit value (step S38_No), the sequencer 105 steps up the program voltage (step S39), and the process returns to step S33.

If the number of program loops reaches the upper limit value (step S38_Yes), the sequencer 105 reports that the write operation is not successfully finished to the NAND controller 26, and terminates the write operation.

If the verification has been passed (step S35_Yes), the sequencer 105 terminates the program loops. Then, if the normal mode is being selected (step S36_Yes), the sequencer 105 reports the write operation having been finished and the program parameter information to the NAND controller 26 (step S37). More specifically, when receiving a command for instructing reading of the program parameter information from the NAND controller 26, the sequencer 105 transmits the program parameter information.

If the smart verify mode is being selected (step S36_No) the sequencer 105 reports that the write operation is finished to the NAND controller 26.

2.4 Command Sequence of Write Operation

Next, a command sequence for a write operation transmitted from the NAND controller 26 to the memory chip 11 will be described using FIG. 8, which illustrates the signal DQ, and the ready/busy signal RBn, during the write operation.

Figure 8:
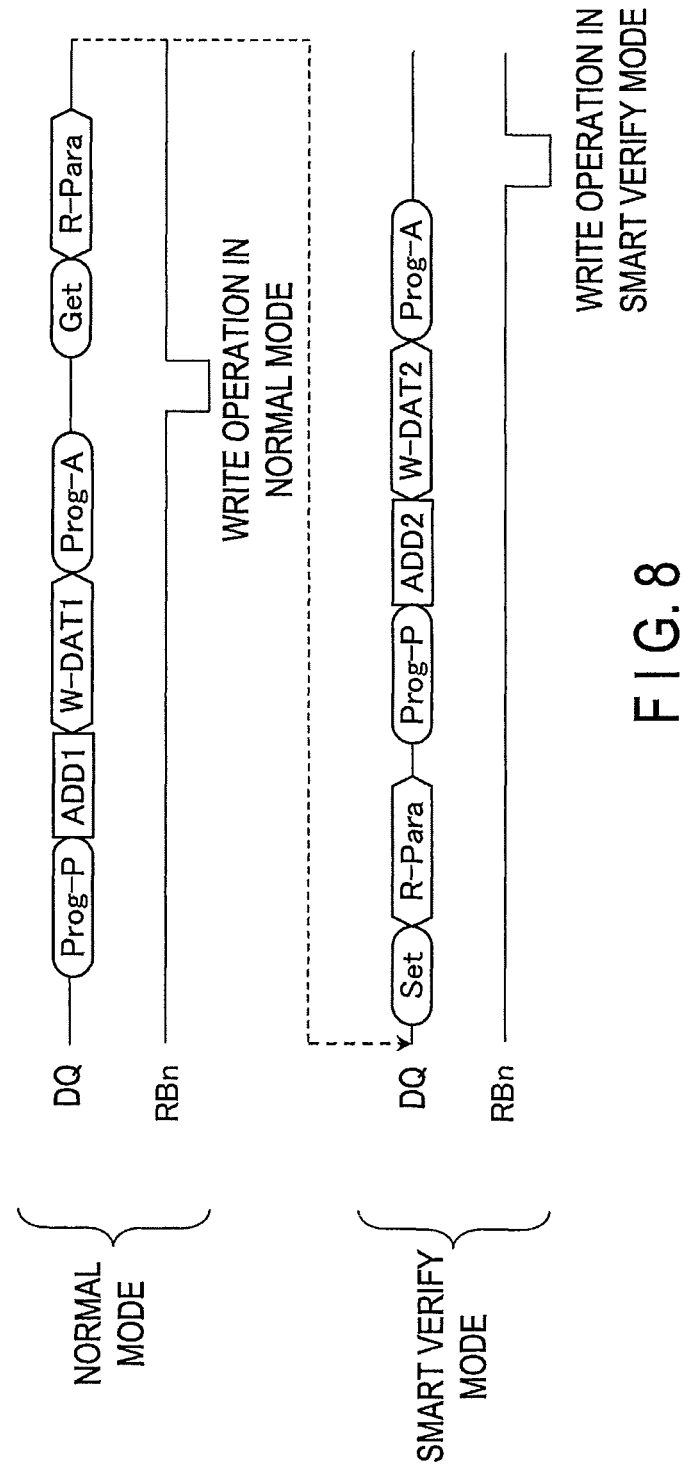
FIG. 8 is a diagram illustrating a command sequence during the write operation in the memory system according to the embodiment.

As illustrated in FIG. 8, when instructing the memory chip 11 to perform the write operation in the normal mode, the NAND controller 26 transmits to the memory chip 11 a command "frog-P," an address "ADD1," write data "W-DAT1," and a command "Prog-A" in this order as a command sequence. The command "Prog-P" is a command for notifying that a program operation is to be performed. The command "Prop-A" is a command for instructing execution of the program operation. When receiving the command "Prog-A," the sequencer 105 executes the program operation after transferring the write data W-DAT1 fetched into the data register 111 to the sense amplifier 110. During the program operation, the sequencer 105 sets the ready/busy signal RBn to an "L" level indicating a busy state.

After the program operation is finished, the sequencer 105 sets the ready/busy signal RBn to an "H" level indicating a ready state. When receiving the "H" level ready/busy signal RBn, the NAND controller 26 transmits a command "Get" for instructing reading of the program parameter information, and reads the program parameter information "R-Para" from the memory chip 11.

In addition, when instructing the memory chip 11 to perform the write operation in the smart verify mode, the NAND controller 26 first transmits to the memory chip 11 a command "Set" and the program parameter information "R-Para" in this order. The command "Set" is a command for instructing setting of the program voltage VPGMS. The sequencer 105 sets the program voltage VPGMS on the basis of the program parameter information "R-Para." Subsequently, similarly to the normal mode, the NAND controller 26 transmits to the memory chip 11 the command "Prog-P," an address "ADD2," write data "W-DAT2," and the command "Prog-A" in this order as a command sequence. The sequencer 105 executes the program operation using the set program voltage. The NAND controller 26 does not transmit the command "Get" in the case of the smart verify mode.

It should be noted that if the write operation in the smart verify mode is executed repeatedly in the same memory area, in the second and subsequent write operations in the smart verify mode, transmission of the command "Set" and the program parameter information "R-Para" may be omitted.

3. Effects of Present Embodiment

According to the configuration of the present embodiment, a memory system that can suppress lowering of processing capability can be provided. Such an effect will be explained in detail.

If the power consumption of the memory system 1 is controlled by the power throttling control, a command exceeding an upper limit value of throttling cannot be executed. Thus, the processing capability of the memory system 1 would be limited. In addition, a power consumption value to be given to a command is a fixed value in many cases.

In contrast, according to the configuration of the present embodiment, the memory system executes a smart verify function, and in executing write operations, it can select two operation modes, that is, the normal mode and the smart verify mode. Furthermore, the memory system can decide a power consumption value corresponding to the smart verify mode according to a program status in the smart verify mode. Accordingly, by using the smart verify mode, the memory system can reduce the power consumption, and set the power consumption value at that time smaller than the power consumption value of the normal mode. Hence, in the power throttling control, the memory system can increase the number of executable commands, and suppress lowering of the processing capability due to the limitation of power consumption.

4. Modification, Etc.

The memory system according to the above embodiment includes a memory chip (11) and a controller (10) coupled to the memory chip and configured to: instruct the memory chip to execute a write operation in one of a first operation mode (normal mode) and a second operation mode (smart verify mode), a program voltage (VPGMS) used in the second operation mode being determined on the basis of first information (program parameter information) obtained in the first operation mode; manage a power consumption value of the second operation mode on the basis of the first information; and perform power throttling control on the basis of the managed power consumption value.

According to the above embodiment, the memory system that can suppress lowering of the processing capability can be provided.

The embodiments are not limited to the above-described aspects, but can be modified in various ways.

For example, the verify level controller 24 may be included in each NAND controller 26, and the function of the command dispatcher 22, the throttling controller 23, the verify level controller 24, or the NAND controller 26 may be realized by the processor 20 executing a firmware.

Furthermore, in the above embodiment, in the write operation, the NAND controller 26 performs an inquiry about a power consumption value to the verify level controller 24, but the NAND controller 26 may read the power consumption value and the program parameter information from the RAM 12 and not via the verify level controller 24.

Furthermore, in the above embodiment, the sequencer 105 sets the power voltage VPGMS in the smart verify mode on the basis of the program parameter information, but the verify level controller 24 or the NAND controller 26 may set the program voltage VPGMS directly.

Furthermore, the memory system may be able to switch ON/OFF of the power throttling control.

Furthermore, the term "couple" or "connection" in the above-described embodiment also includes the state of indirect coupling or connecting via a transistor, a resistor, or the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory including a plurality of regions; and
a controller coupled to the nonvolatile memo and configured to:
instruct the nonvolatile memory to execute a write operation in one of a first operation mode and a second operation mode, a program voltage used in the second operation mode being determined on the basis of first information obtained in the first operation mode, wherein
the nonvolatile memory is configured to transmit the first information to the controller after executing the write operation in the first operation mode, and
the controller is further configured to:
manage, for each of the plurality of regions;
a status indicating whether the first information is available or not, and
a first power consumption value of the first operation mode and a second power consumption value of the second operation mode;
in instructing the write operation to the nonvolatile memory;
determine, if the first information is not available, a power consumption value of the write operation as the first power consumption value, and
determine, if the first information is available, the power consumption value of the write operation as the second power consumption value;
perform power throttling control on the basis of the determined power consumption value of the write operation;
update the second power consumption value of the second operation mode on the basis of the first information; and
upon a data erase operation being performed on one region of the plurality of regions, change the status of the one region to indicate that the first information is not available.

2. The memory system according to claim 1, wherein the write operation includes a plurality of program loops each of the program loops includes a program operation and a program verify operation, and
the program voltage used in an initial program loop of the second operation mode is higher than a program voltage used in an initial program loop of the first operation mode.

3. The memory system according to claim 2, wherein the first information includes the number of the program loops when the write operation is executed in the first operation mode.

4. The memory system according to claim 2, wherein the program voltage used in the initial program loop of the second operation mode is determined on the basis of the first information.

5. The memory system according to claim 2, wherein the number of the program loops of the second operation mode is smaller than the number of the program loops of the first operation mode.

6. The memory system according to claim 2, wherein the program voltage in the first operation mode is stepped up each time the program loop is repeated.

7. The memory system according to claim 2, wherein the program voltage in the second operation mode is stepped up each time the program loop is repeated.

8. The memory system according to claim 2, wherein the program voltage used in the initial program loop of the second operation mode is lower than a program voltage used in a last program loop of the first operation mode.

9. The memory system according to claim 1, wherein the first information includes writing speed information of the write operation in the first operation mode.

10. The memory system according to claim 1, wherein each of the plurality of regions is a block, and
the controller is configured to determine the power consumption value of the write operation in a unit of the block.

11. The memory system according to claim 1, wherein each of the plurality of regions is a memory chip, and
the controller is configured to determine the power consumption value of the write operation in a unit of the memory chip.

12. The memory system according to claim 1, wherein the nonvolatile memory is a NAND-type flash memory.

13. The memory system according to claim 1, wherein power consumed in the first operation mode is more than power consumed in the second operation mode.

14. The memory system according to claim 1, wherein a power consumption value of the first operation mode is larger than a power consumption value of the second operation mode.

15. The memory system according to claim 14, wherein the number of write operations simultaneously executable in the second operation mode is larger the number of write operations simultaneously executable in the first operation mode.

16. The memory system according to claim 1, wherein when a requested operation that is to be a target of the power throttling control is finished in the nonvolatile memory, the controller modifies a power consumable amount for the power throttling control.

17. The memory system according to claim 16, wherein the controller is further configured to determine whether or not a command is executable, on the basis of a result of comparing a power consumption value of the command and the power consumable amount.

18. The memory system according to claim 1, wherein the write operation and an erase operation are included in a target of the power throttling control.

* * * * *